United States Patent

[11] 3,604,122

| [72] | Inventor | Hubert Dupuis |
| | | Warren, Mich. |
| [21] | Appl. No. | 814,583 |
| [22] | Filed | Apr. 9, 1969 |
| [45] | Patented | Sept. 14, 1971 |
| [73] | Assignee | Allegheny Ludlum Steel Corporation |
| | | Pittsburgh, Pa. |

[54] MAGNETIC SETUP GAUGE
1 Claim, 4 Drawing Figs.

[52] U.S. Cl. .................................................. 33/185, 33/169 R
[51] Int. Cl. .................................................. B27g 23/00
[50] Field of Search ...................................... 33/185, 201, 169 A, 169 B, 168 B, 168 A

[56] References Cited

UNITED STATES PATENTS

| 2,412,870 | 12/1946 | Champlin | 33/169 (A) |
| 3,106,023 | 10/1963 | Wilson | 33/185 (X) |
| 3,486,236 | 12/1969 | Bennett | 33/169 (BX) |

FOREIGN PATENTS

| 859,556 | 12/1952 | Germany | 33/DIG. 1 |

*Primary Examiner*—William D. Martin, Jr.
*Attorney*—Whittemore, Hulbert & Belknap

ABSTRACT: Gauge for setting cutting inserts into a holder comprising a support including magnets for attachment to the holder, and an adjustable gauging abutment on the support.

PATENTED SEP 14 1971 3,604,122

INVENTOR.
HUBERT DUPUIS
BY Whittemore,
Hulbert & Belknap
ATTORNEYS

MAGNETIC SETUP GAUGE

BRIEF SUMMARY OF THE INVENTION

The invention comprises a support body having one or more magnets by means of which the support body may be attached to a tool. The support body includes means for adjustably carrying a gauging element, preferably in the form of a carbide rod.

The gauge is readily movable over a tool body such for example as a milling cutter to position the gauge adjacent the ends of the slots carrying the carbides so that the carbide inserts may be accurately positioned with reference to axial extension beyond a side of the holder.

DETAILED DESCRIPTION

Figure 1:
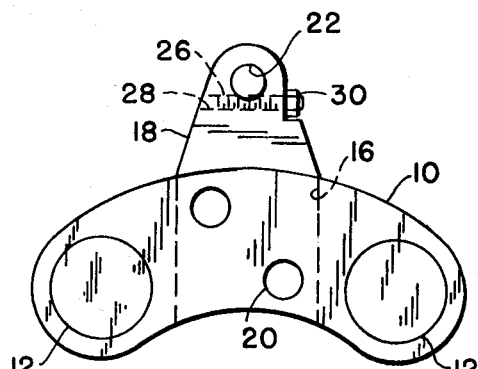
FIG. 1 is a front elevational view of the gauge.
Figure 2:
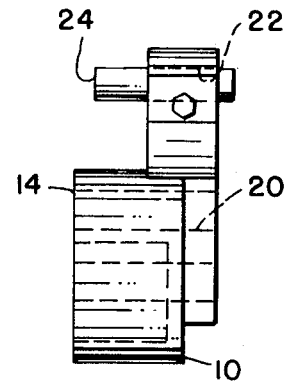
FIG. 2 is a side elevational view of the gauge.

Referring to FIGS. 1 and 2 the gauge comprises a magnetic base 10 illustrated as formed of generally arcuate shape and provided with openings adjacent either end to receive permanent magnets 12, the ends of which are flush with the inner surface 14 of the base 10. The base is provided with an elongated slot 16 which receives one end of a replaceable arm 18, the arm being attached to the base by fastening means such for example as screws indicated at 20.

At the outer end of the arm there is provided a cylindrical opening 22 which receives an elongated adjustable contact element 24. This element may conveniently be in the form of a cylindrical carbide rod. Means are provided for adjusting the contact element 24 longitudinally and for clamping it in adjusted position. This adjusting and clamping means comprises a stud 26 having a threaded end 27 received in a smooth cylindrical opening 28 in the arm intersecting the cylindrical opening 22. Conveniently, the stud may be advanced to the approximate position shown in FIG. 1 after which a drill of approximately the same size as the opening 22 is advanced through the opening, cutting a shallow cylindrical notch in one side of the stud 26. The protruding end of the stud 26 is engaged with a clamping nut 30.

From the foregoing construction it will be apparent that when the contact element 24 is in position in the opening 22 it will enter the cylindrical notch formed at one side of the stud and hence will prevent rotation of the stud. Under these circumstances, rotating the nut 30 will have the effect of drawing the stud axially to clamp the contact element 24 in adjusted position. This clamping action takes place without exerting any axial forces on the contact element so that it will be accurately clamped in whatever position it occupies when the nut 30 is tightened.

Figure 3:
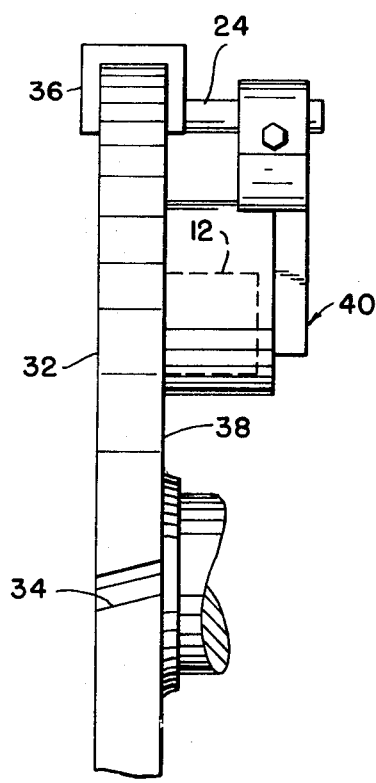
FIG. 3 is an elevational view showing one mode of using the gauge in a milling cutter.

Referring now to FIG. 3, one mode of use of the gauge is illustrated. Here it is shown as employed with a milling cutter 32 having a plurality of peripheral notches, only one of which is illustrated at 34, adapted to receive cutting inserts 36 such as formed of carbide. In this situation it is assumed that the surface 38 of the cutter body 32 is qualified and therefore the gauge which is here indicated in its entirety at 40, may be moved anywhere over the surface 38 with the contact element 24 thereof opposite the end of one of the slots 34. Thereafter, the insert 36 is positioned in the slot and moved so that one edge thereof engages the end of the contact element 24, after which the insert is locked in position.

Figure 4:
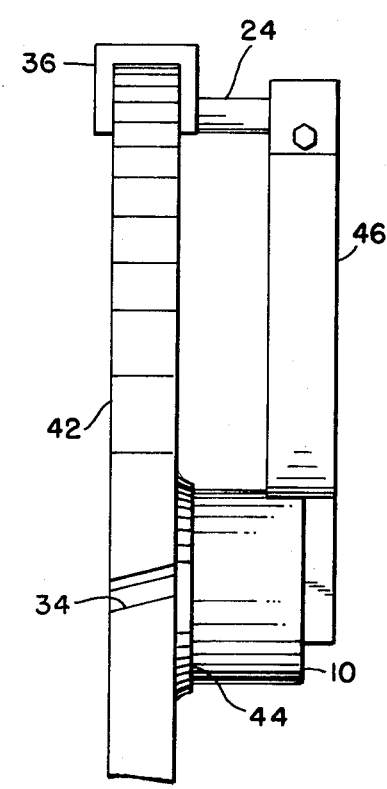
FIG. 4 is a view similar to FIG. 3, showing a somewhat different mode of use.

A similar use is indicated in FIG. 4 except that here it is assumed that the accurately qualified surface of the cutter body 42 is the hub surface 44. Accordingly, the magnetic base 10 is applied to the surface 44 of the hub. This of course requires a longer arm to support the contact element 24 in the proper position, and in this case such elongated arm is indicated at 46.

What I claim as my invention is:

1. A magnetic setup gauge for use with an inserted cutter body having a qualified flat surface at one side thereof perpendicular to its axis, said gauge comprising a base having a single flat mounting surface engageable with the qualified flat surface of the cutter body, permanent magnet means in the base having pole faces coplanar with the flat mounting surface of said base to provide for attachment of the base to the properly qualified flat surface at one side of said inserted blade cutter body, said base being laterally recessed at one side to provide for attachment of said base to a qualified annular surface on the cutter body without interference with a projection on the cutter body extending outwardly beyond its qualified annular surface, said pole faces being located generally at opposite sides of the lateral recess to attach to the qualified annular surface of the cutter body at opposite sides of the projection thereon, an arm extending laterally from the base, an opening through the outer end of the arm perpendicular to the flat mounting surface of said base, a contact element slidable longitudinally in the opening, and means for clamping the contact element in adjusted position.